Sept. 10, 1968  M. S. NURY  3,401,040
CONTINUOUS SEPARATION OF JUICE FROM GRAPE SOLIDS
Filed July 27, 1964  2 Sheets-Sheet 1

INVENTOR.
MASSUD S. NURY
BY
*Eckhoff and Slick*
ATTORNEYS

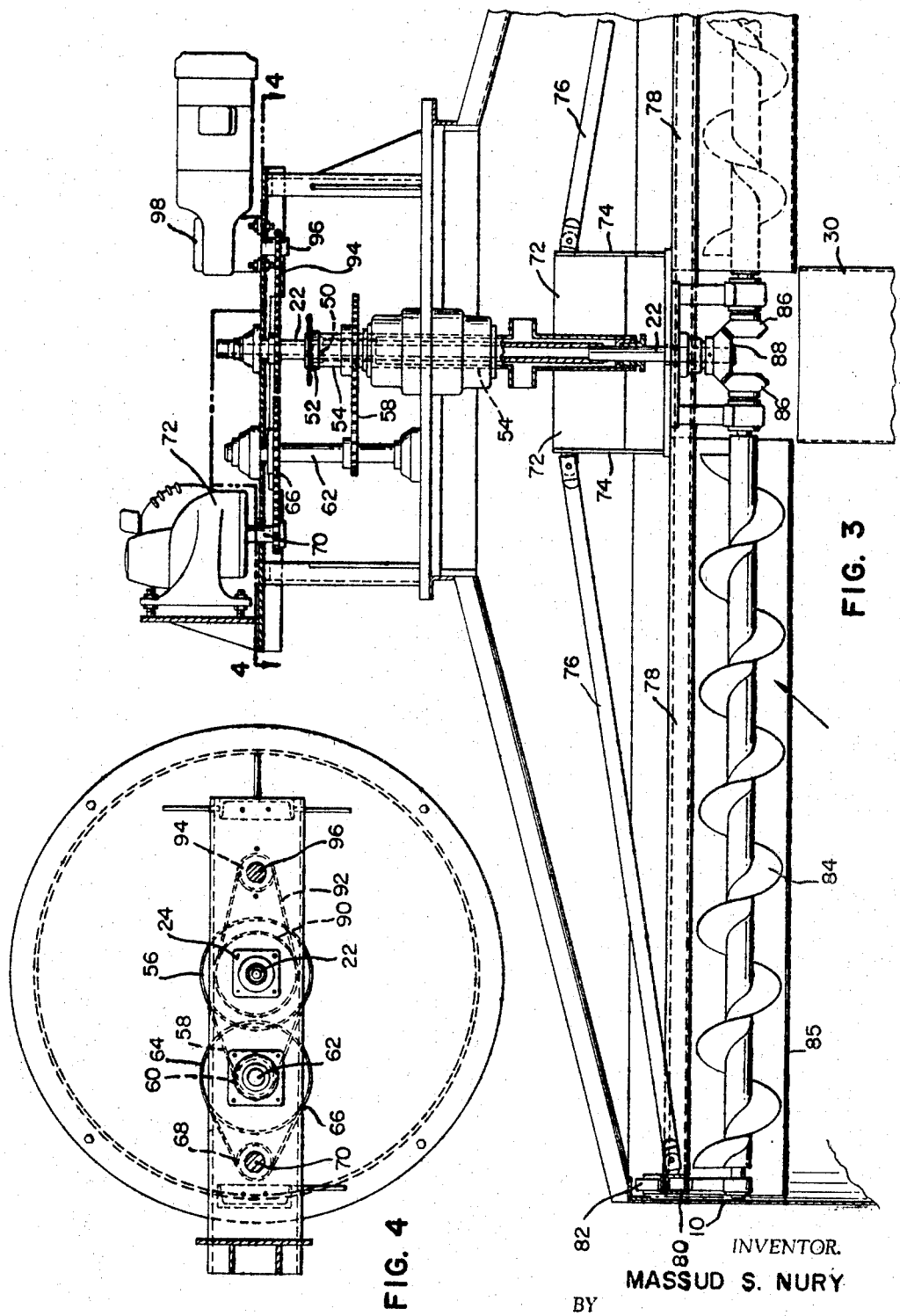

United States Patent Office 3,401,040
Patented Sept. 10, 1968

3,401,040
CONTINUOUS SEPARATION OF JUICE
FROM GRAPE SOLIDS
Massud S. Nury, P.O. Box 2896,
Fresno, Calif. 93745
Filed July 27, 1964, Ser. No. 385,125
6 Claims. (Cl. 99—105)

ABSTRACT OF THE DISCLOSURE

A process for separating grape pulp from grape juice wherein the grapes are crushed, and fed into a settling zone to allow natural enzymes to condition the grapes whereby the crushed grapes are separated by gravity into a lighter pulp solids layer and a heavier liquid and additional grapes are introduced into the settling zone at an intermediate point while solids are withdrawn from the top surface of the zone and liquid is drawn from the bottom of the zone.

This invention relates in general to a process and apparatus for continuously separating fruit solids from juice and more particularly to a process and apparatus designed to separate insoluble grape pulp, seeds, if any, and other insoluble solids from grape juice.

Whenever it is desired to separate fruit pulp from the juice as, for example, in treating peaches, plums, nectarines or, especially, grapes, difficulties are encountered in separating the pulp, seeds and stems from the juice or wine. Belt presses are used in some commercial operations, but these require large quantities of filter aid which must thereafter be extracted with water to recover the substantial amount of grape sugar that is held by the filter cake. Another process permits the crushed grapes to drain on screens to recover a relatively small amount of free run juice, followed by treating the remaining solids and juice with high pressure water jets, which "scalps" the pulp from the skins so as to recover additional sugar, but the resultant juices are of low sugar concentration and high in suspended solids, which precludes their use as a juice and makes them usable only as fermenting material for the production of low value alcohol.

In the wine industry, a common procedure is to pump crushed grapes into tanks and permit gravitational separation of juice and pulp. Some juice eventually separates at the bottom and some solids at the top. After the "free-run" juice has been removed from the tank, some juice and solids remain, the latter containing about one-third of the total juice originally present in the grapes, thus requiring supplemental recovery methods.

A method and apparatus to separate the solids and the liquid in a continuous fashion and with less difficulty would facilitate production of both grape juice and wine and, for that matter, other fruit juices.

It is therefore an object of this invention to provide a method and apparatus for separating fruit pulp from the juice.

It is a further object of this invention to provide a process and apparatus which permits elimination of many of the supplemental juice recovery steps commonly practiced and which can be operated on a continuous basis.

Further objects and advantages of this invention, if not specifically set forth, will become apparent during the course of the description which follows.

In the drawings:

FIGURE 3 is a fragmentary, enlarged, partially sectional side elevation of the top of the tank of FIGURE 1.

FIGURE 4 is a sectional view through the line 4—4 of FIGURE 3.

Generally, this invention comprises, insofar as it relates to a process, the separation of insoluble fruit pulp from the juice of fruit comprising crushing the fruit, charging the crushed fruit so formed to a separator tank, permitting the crushed fruit to separate into a lighter pulp solids layer and a heavier liquid layer and thereafter introducing additional fruit which has been subjected to the first step into the separator tank at a point intermediate the pulp solids accumulated at the surface and the lowermost portions of the liquid while withdrawing solids from the surface of the separator tank and liquid from a point near the bottom of the separator tank.

Insofar as it relates to an apparatus, this invention comprises a large cylindrical tank, preferably having a sloping bottom to facilitate drainage of fluid therefrom, and which has suspended from the center of the top thereof a double auger conveyor, opposite sides of the conveyor trough of which have been removed to expose one side of each screw. The individual screws are driven so as to convey material scooped up by the conveyor troughs toward the center and the screws are mounted to rotate slowly with their leading surfaces exposed. A vertical conduit is positioned at the center of the tank immediately beneath the discharge ends of the screws, which conduit leads downwardly to another screw conveyor in communication therewith which is capable of conveying solid materials through a discharge port in the side of the tank.

Figure 1:
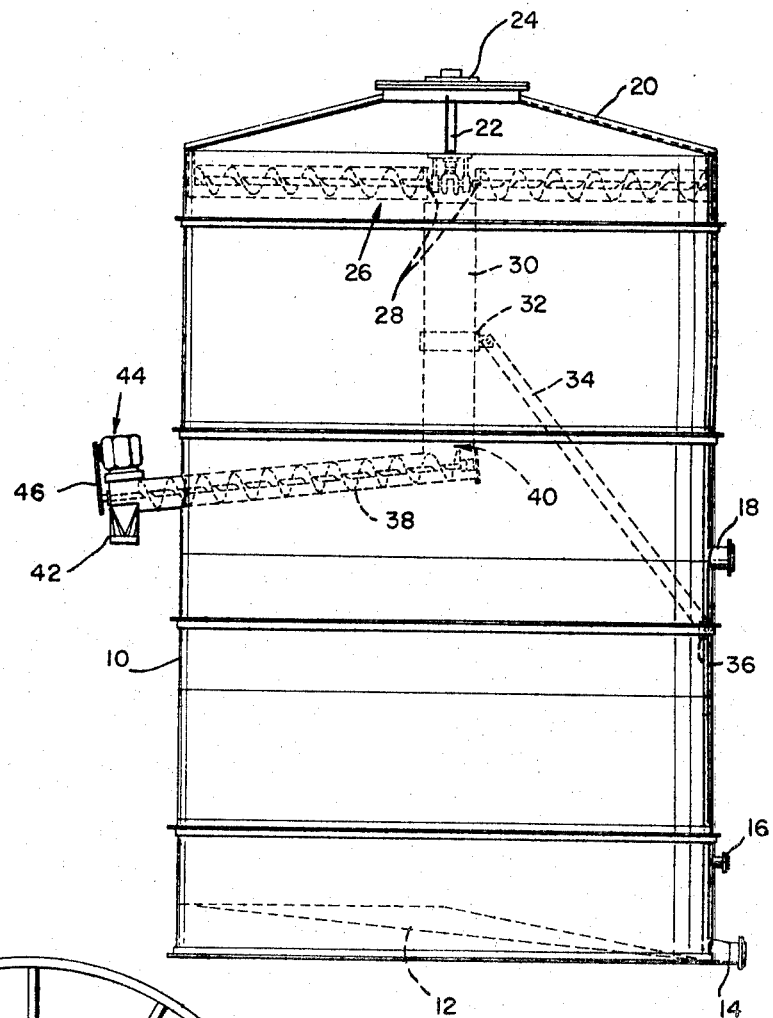
FIGURE 1 is a fragmentary side elevation, partly in section, showing the apparatus of this invention.
Figure 2:
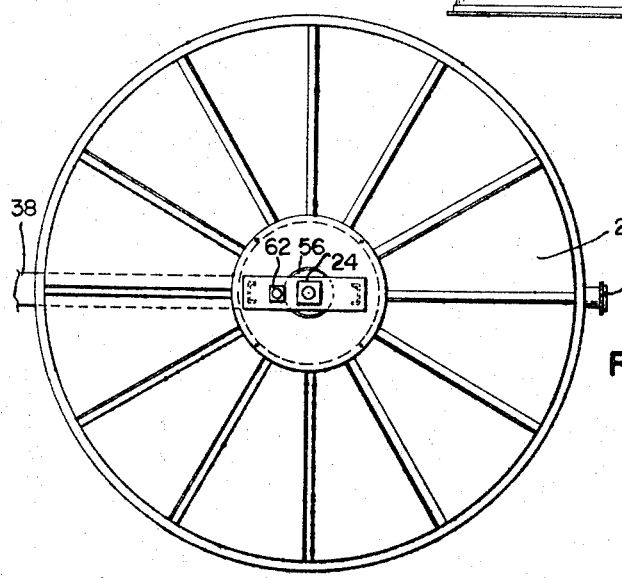
FIGURE 2 is a plan view of the apparatus of FIGURE 1.

Referring now to the drawings wherein like characters refer to like parts throughout, there is shown in FIGURE 1 a cylindrical tank 10 formed of a plurality of cylindrical segments secured one to the next and having a generally downwardly sloping or trough-shaped bottom 12. As shown in phantom view in FIGURE 1, the bottom is sloped toward a liquid discharge port 14. Another smaller discharge port 16 appears immediately thereabove, together with an inlet stub 18 through which a crushed pulpy mass of fruit may be introduced into the tank. Suspended from the top 20 by means of shaft 22 journaled in the generally horizontal collar 24 is the double auger or screw conveyor, generally 26. This is shown more particularly in FIGURE 3 and will be described in detail hereinafter.

Immediately beneath each discharge end 28 of the halves of the double auger conveyor is the vertical pipe 30 supported by means of steel hoop 32 and brace 34, in turn secured at 36 to one side of the tank. At the lowermost end of the vertical pipe 30 is an additional screw conveyor 38 consisting of a conventional screw entirely enclosed by the conduit excepting at the uppermost end 40 where it is in communication with the discharge end of pipe 30 and at the lowermost end where it discharges into a conveyor or hopper 42. The screw of conveyor 38 is operated by motor and gear reducer system, generally 44, and by chain drive 46.

Attention is now directed to FIGURE 3 where the construction of the uppermost portion of the tank is set forth in greater detail. A collar 50 is secured to the shaft 22 and a flanged sleeve 52 is supported by the collar for rotation relative thereto. Shaft 54 which is concentric with shaft 22 is in turn telescoped into sleeve 52 and secured thereto and has sprocket 56 keyed thereto. The sprocket is driven by a chain 58, in turn driven by the sprocket 60 on shaft 62. The shaft in turn is driven by sprocket 64 keyed to the shaft, in turn driven by the chain 66 driven by sprocket 68 keyed to the shaft 70 of the motor 72. It will be seen that this provides a speed reduction system such that the double auger conveyor system 26 can be rotated slowly. Welded to opposite sides of the lowermost portion of the shaft 54 are outstanding flanges 72 to which are welded, so as to form a T in cross-section, narrow rails 74. Supporting straps 76 are secured to the beam 78 which in turn supports the ring 80 on top of opposite sides of which are mounted the rollers or casters 82 and beneath which are supported the conveyor assemblies. These consist of a pair of helical screws 84 journaled and supported at either end. Bevel gears 86 are driven by a single gear 88 keyed to the lowermost extension of shaft 22. Support beam 78 was suspended beneath it approximately one-half, designated 85, of the normally used conveyor trough, or about 90° thereof, so that as the conveyor shown at the left of FIGURE 3 advances toward the viewer from the plane of the paper, the lowermost edge of the trough will act as a scoop as the conveyor advances solid materials toward the cylindrical conduit 30. The shaft 22 is driven through sprocket 90, chain 92, and sprocket 94 keyed to the shaft 96 of the motor 98.

The process of this invention is dependent on the fact that conventional crushing adds a significant amount of air, finely dispersed, to grape pulp. Because of the fibrous, fluffy nature of the pulp, the air remains incorporated therein and may be used in a system to buoy up the pulp. Furthermore, after crushing, when the pulp is passed into the separator tank of this invention, the natural enzymes continue to work and some of these break down the cell walls of the juice sacs so as to allow the juice to drain. Over generally longer periods of time, other enzymes affect the colloidal material present so as to allow coagulation of this colloidal matter and clarification of the juice.

The pulp is pumped into the inlet 18 at a rate such that the surface solids, when ready for removal, contain less than 85% liquid. The pulp in the tank continues to undergo changes, throughout its residence in the tank, allowing the juice to drain out and a change in the colloidal structure so as to permit the juice to "break" or clarify through the action of the second group of enzymes mentioned above. Simultaneously, the conveyor assembly 26 is rotated and solids containing less than 85% liquid are advanced to the vertical conduit 30 and are discharged by means of the conveyor 38.

As a practical matter, the enzymatic step permitting separation of the pulp and especially the skins from the liquid requires two to four hours for proper drainage, with faster enzyme activity in the early part of the harvest season and a slower enzyme activity and hence slower drainage in the latter part of the season.

The second enzyme-induced change to which reference has been made, wherein the colloidal material is acted upon by enzymes so as to permit coagulation and clarification of the juice, requires from 3 to 10 hours and generally from 4 to 6 hours, depending upon the condition of the grapes. Conveniently, this step may take place in a tank separate from that of this invention. It may be said that an adequate time has been permitted for the "break" or clarification step when hourly removal of the juice from the collecting tank followed by heating to a temperature of at least 165° F. reveals that the juice, either during or shortly after hearing, forms flocular masses with clear juice between the floc islands. This control procedure will indicate the time at which the juice is ready for further processing, which generally consists of heating the entire quantity of juice to at least 160° F. to kill yeasts and inhibit further enzyme activity.

It is seen, therefore, that two alternative procedures are possible. After a relatively short period of time when enzymes have simply opened the juice cells sufficiently to permit the juice to drain out and the surface solids have reached a level of something less than 85% liquid, the unclarified juice may be removed from the bottom of the tank through outlet 16 and solids skimmed from the surface. This juice may be placed in a different tank and permitted to remain there for a sufficient period of time for the second stage of enzyme activity, resulting in the "break" or clarification. In the alternatve, the juice and solids may be retained in the tank 10 for a sufficient period of time to permit both the drainage of a relatively large percentage of the liquid from the solids and also to permit the second stage of enzyme activity wherein the juice clarifies, as determined by the sampling and testing procedure.

Generally, if the tank of this invention is to be used at greatest efficiency, however, the clarification step will be permitted to take place in a separate tank, in which case crushed grapes will be fed into the settling tank at a rate equal to the time required to drain the solids to something less than 85% liquid. If this takes two hours at 70–90° F., thereby producing a well-drained, low liquid-content solids layer at the surface and a low solids juice near the bottom of the tank, crushed grapes would be fed to a 30,000 gallon tank at a rate of 15,000 gallons per hour. Generally, the rate of feed, when one employs this procedure, will be equal to ⅛–⅓ of the volume of the vessel.

Of the aforementioned ⅛–⅓ of the total volume of the tank drained each hour, approximately 25% thereof by volume is the drained pulp at the surface and approximately 75% by volume is the juice.

The process may be carried out using structures differing somewhat from the tank described above as, for example, by using a square tank having a strong curved knife or double auger conveyor, with the inner sides of each conveyor though joined together and with the outside half of each conveyor trough removed and mounted on rails at either side of the tank. The conveyor or knife is moved slowly back and forth across the tank, effectively slicing and removing the rising solids.

The solids removed are relatively well drained but may be further pressed using any of the available conventional pressing means for the recovery of additional juice. By contrast, where one is dealing with freshly crushed grapes, the slimy crushed fruit cannot be pressed.

A variation is possible where one plans to make wine and desires to initiate fermentation of the juice at an early stage. The naturally occurring grape enzymes are augmented with suitable yeasts and the fermentation which takes place in the separator tank provides $CO_2$ which aids in lifting the solids to the surface where they can be removed in the fashion described above. After equilibrium is attained, crushed grapes (without additional yeast) are continuously added at the middle of the separator tank and withdrawal of the relatively light solids and the relatively clarified fermenting liquid beneath proceeds as describe above. The solids removed from the top are similar to those obtained when following the procedure described above in that they are well drained and readily pressed to permit removal of the last vestiges of juice or partially fermented liquid therein.

Use of yeast in this fashion permits a somewhat higher rate of introduction of the crushed grapes as well as a higher rate of removal of liquid and drained solids in that the carbon dioxide produced speeds the gravity separation.

Example 1.—Processing of white grapes for juice production

In a test of the process of this invention, 188 tons of Emperor grapes were crushed and pumped into a square concrete tank of 19,000 gallon capacity. When the tank which had a total capacity suitable for 86 tons of grapes was 80% filled, juice draw was started at a rate slightly slower than the addition rate of 30 tons/hr. of the crushed grapes. When the tank was full the surface solids were found to be well drained and were then continuously removed with a single auger conveyor with half the auger trough removed. This auger unit slowly swept across the tank surface and removed the surface solids. The juice removed during this run contained 0.5% solids by volume, as determined by centrifuging, and the surface solids contained 82% moisture by weight. The withdrawn juice two hours later was heated to a temperature of 165° F. to stop the enzymatic action.

Example 2.—Red grape processing

Destemmed crushed Salvador grapes were heated to 190° F. to deactivate enzymes and weaken plant cells, then cooled to 150° F. at which time 15 ml. of Rohm & Haas 59L pectic enzyme per ton of grapes was injected into the must line and the mixture fed continuously at the rate of 30 tons per hour into the middle of a cylindrical 15,000 gallon separation tank of the structure described above. The tank capacity is equivalent to about 70 tons of grapes. When the tank was filled, juice was continuously withdrawn 12 inches above the bottom of the tank at the rate of approximately 5,000 gallons per hour, and solids were continuously removed at the rate of about 7 tons per hour by means of the auger conveyor sweeping across the surface of the tank. The removed juice had an average solids content of 0.6% by volume by centrifuge and the removed solids contained 85% liquid by weight and were suitable for pressing.

Example 3.—Processing of fermenting must

Destemmed crushed grapes (Thompson Seedless) were pumped continuously into the middle of the 36,000 gallon separator tank of this invention at the rate of 50 tons per hour. A 25 pound cake of Montrachet yeast was added to the tank at the beginning of crushed grape entry. When the tank was full, fermentation activity by the yeast, aided by natural enzyme, was noticeable, and the evolving carbon dioxide helped to propel the grape solids upward, where a drained, relatively dry layer of solids formed. At this time mildly fermenting juice was continuously removed from near the bottom of the tank at the rate of about 8,500 gallons per hour and solids of 80% moisture were removed continuously at the rate of about 10 tons per hour by the auger conveyer sweeping across the surface of the solids layer. The fermenting juice had a solids content of 0.9% by volume by centrifuge.

In comparison to conventional California grape juice separating techniques, by following the teachings of this invention, it is possible to obtain a cleaner separation of juice and solids, the number of tanks needed for separating the juice and solids is cut considerably and higher yields of juice are obtained, in part because the solids are well drained and easily pressed. The process is a continuous one using an essentially closed tank which makes it considerably more sanitary than most separation procedures for grape pulp and juice.

Obviously, many modifications and variations may be made without departing from the spirit and scope of this invention, and therefore only such limitations should be imposed as are indicated in the appended claims.

I claim:
1. A process for the separation of insoluble grape pulp from the juice of grapes comprising:
   (a) crushing the said grapes;
   (b) charging said crushed grapes so formed into a settling zone to allow natural enzymes to condition the grapes for better juice drainage and later coagulation of colloidal matter;
   (c) permitting said crushed grapes to separate by gravitation into a lighter pulp solids layer and a heavier liquid layer; and
   (d) introducing additional grapes prepared in accordance with paragraph (a) into said settling zone at a point intermediate the pulp solids layer and the lowermost portions of said liquid while withdrawing solids from the surface of said settling zone and withdrawing liquid from a point beneath the point of introduction of the said additional crushed grapes.

2. The process of claim 1 wherein the grapes crushed in accordance with paragraph (a) are treated with yeast to cause fermentation and faster separation of the liquid formed in the settling zone from the solids formed on top of the tank.

3. The process of claim 1 wherein the liquid drawn off is permitted to stand for a period of time in a separate clarification zone.

4. A process for the separation of insoluble grape pulp from grape juice comprising:
   (a) crushing the said grapes;
   (b) charging the said crushed grapes so formed into a settling zone;
   (c) permitting said crushed grapes to remain in the said settling zone for a period of time sufficient to permit drained solids to appear on the surface thereof containing less than about 85% liquid; and
   (d) introducing additional crushed grapes prepared in accordance with paragraph (a) into said settling zone at a point intermediate said pulp solids layer and the lowermost portions of the settling zone while withdrawing solids from the surface of said settling zone and withdrawing liquid from a point beneath the point of introduction of the said crushed grapes, said withdrawal of solids and liquid being carried out at a rate of about equal to the rate of the addition of the said crushed grapes.

5. A process for the preparation of insoluble grape pulp from grape juice comprising:
   (a) crushing said grapes;
   (b) charging the said crushed grapes so formed into a settling zone;
   (c) permitting said crushed grapes to remain in the said settling zone for a period of time sufficient to permit the layer of relatively drained pulp solids containing less than about 85% liquid to form on the surface of the said liquid;
   (d) introducing additional crushed grapes prepared in accordance with paragraph (a) into said settling zone at a point intermediate said pulp solids layer and the lowermost portions of the said settling zone while withdrawing solids from the surface of the said settling zone and withdrawing liquid from a point beneath the point of introduction of the said crushed grapes, said withdrawal of solids and liquid being carried out at a rate about equal to the rate of addition of said crushed grapes;
   (e) conveying the said liquid to a clarification zone and permitting the said liquid to remain in the said clarification zone for a period of time sufficient to permit the said juice to clarify, as determined by the ability of colloidal material in the said juice to coagulate to leave relatively clear areas of juice therebetween when samples of the said juice are heated to a temperature of at least about 165° F.; and
   (f) heating all of the said juice to a temperature of at least about 150° F.

6. A process for the preparation of insoluble grape pulp from grapejuice comprising:
   (a) crushing said grapes;
   (b) charging the said crushed grapes so formed into a settling zone;
   (c) permitting said crushed grapes to remain in the said settling zone for a period of time sufficient to permit a layer of pulp solids to form on the surface thereof containing less than about 85% liquid and for a period of time sufficient to permit the juice near the bottom of the tank to clarify as determined by the ability of the colloidal material in the said juice to coagulate when the said juice is heated to a temperature of at least about 165° F. whereby to leave relatively clear juice therebetween; and
   (d) introducing additional crushed grapes prepared in accordance with paragraph (a) into said settling zone at a point intermediate said pulp solids layer and the lowermost portions of the settling zone while withdrawing pulp solids from the surface of said settling zone and withdrawing clarified liquid from a point beneath the point of introduction of the said crushed grapes, said withdrawal of pulp solids and relatively clarified liquid being carried out at a rate about equal to the rate introduction of said crushed grapes.

References Cited

UNITED STATES PATENTS

| | | | |
|---|---|---|---|
| 3,301,684 | 1/1967 | Bosy | 99—105 |
| 3,282,425 | 11/1966 | Christian | 210—83 |
| 2,852,138 | 9/1958 | Knight et al. | 210—83 |

A. LOUIS MONACELL, *Primary Examiner.*

M. A. VOET, *Assistant Examiner.*